No. 698,234. Patented Apr. 22, 1902.
P. C. WARING.
AUTOMATIC FEEDING AND WEIGHING MECHANISM.
(Application filed July 17, 1900.)
(No Model.) 3 Sheets—Sheet 1.
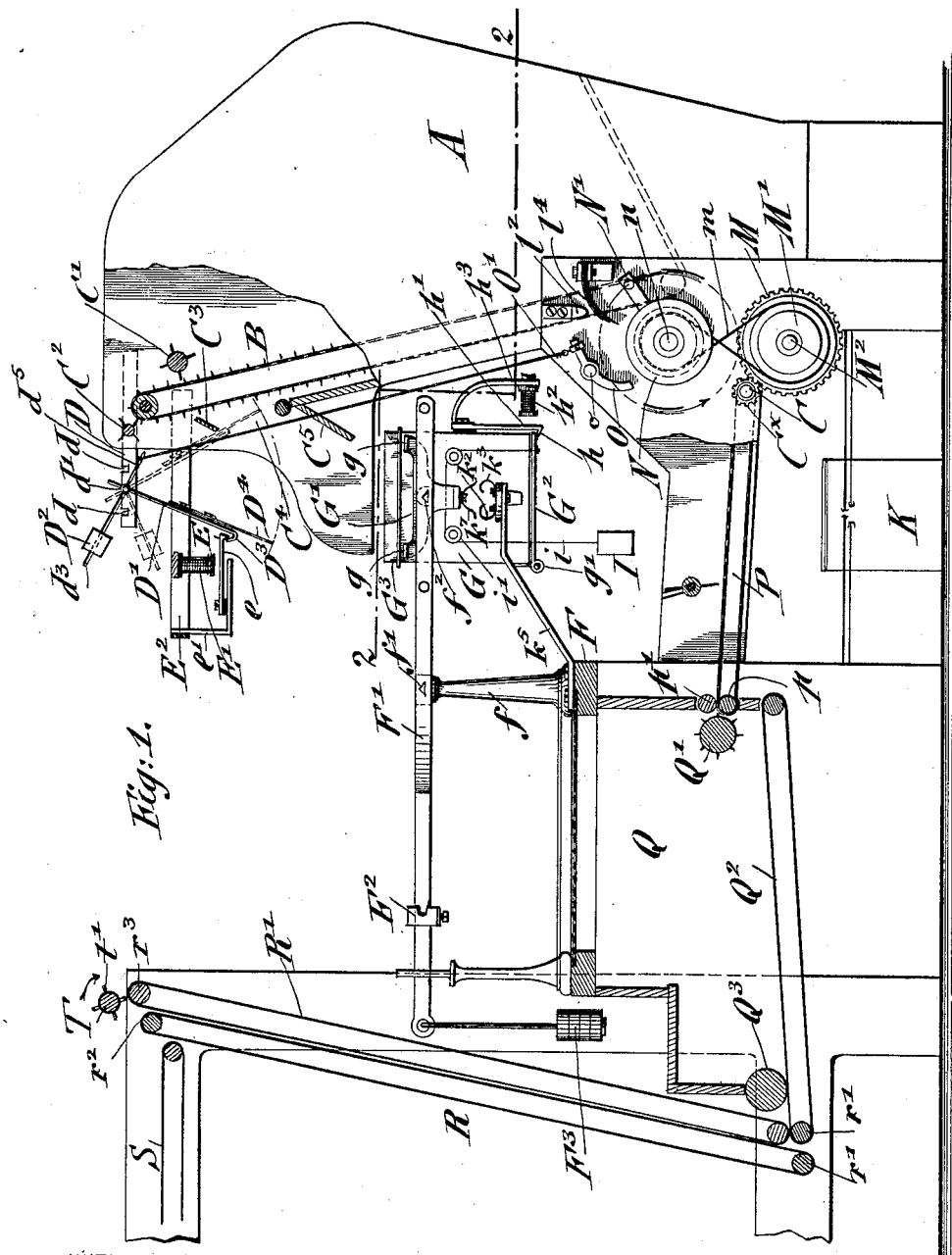
INVENTOR
Pierre C. Waring
BY
ATTORNEYS

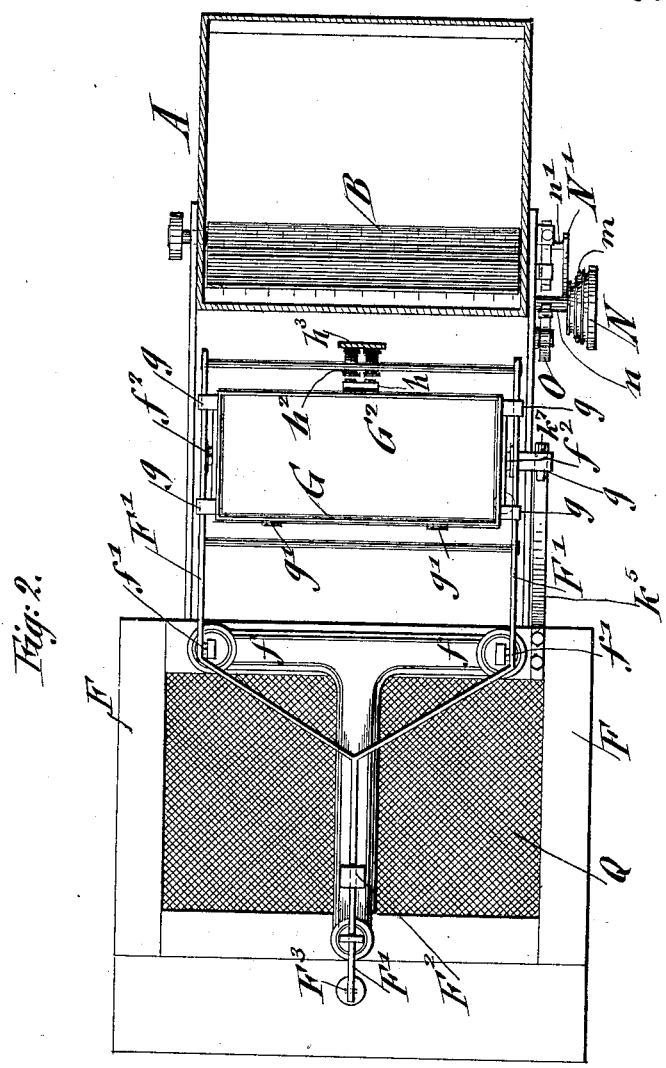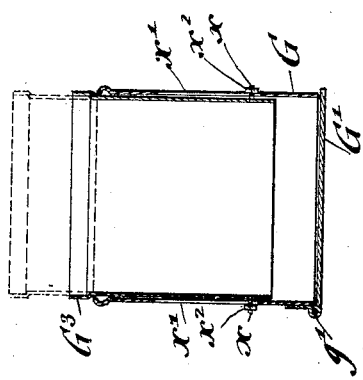

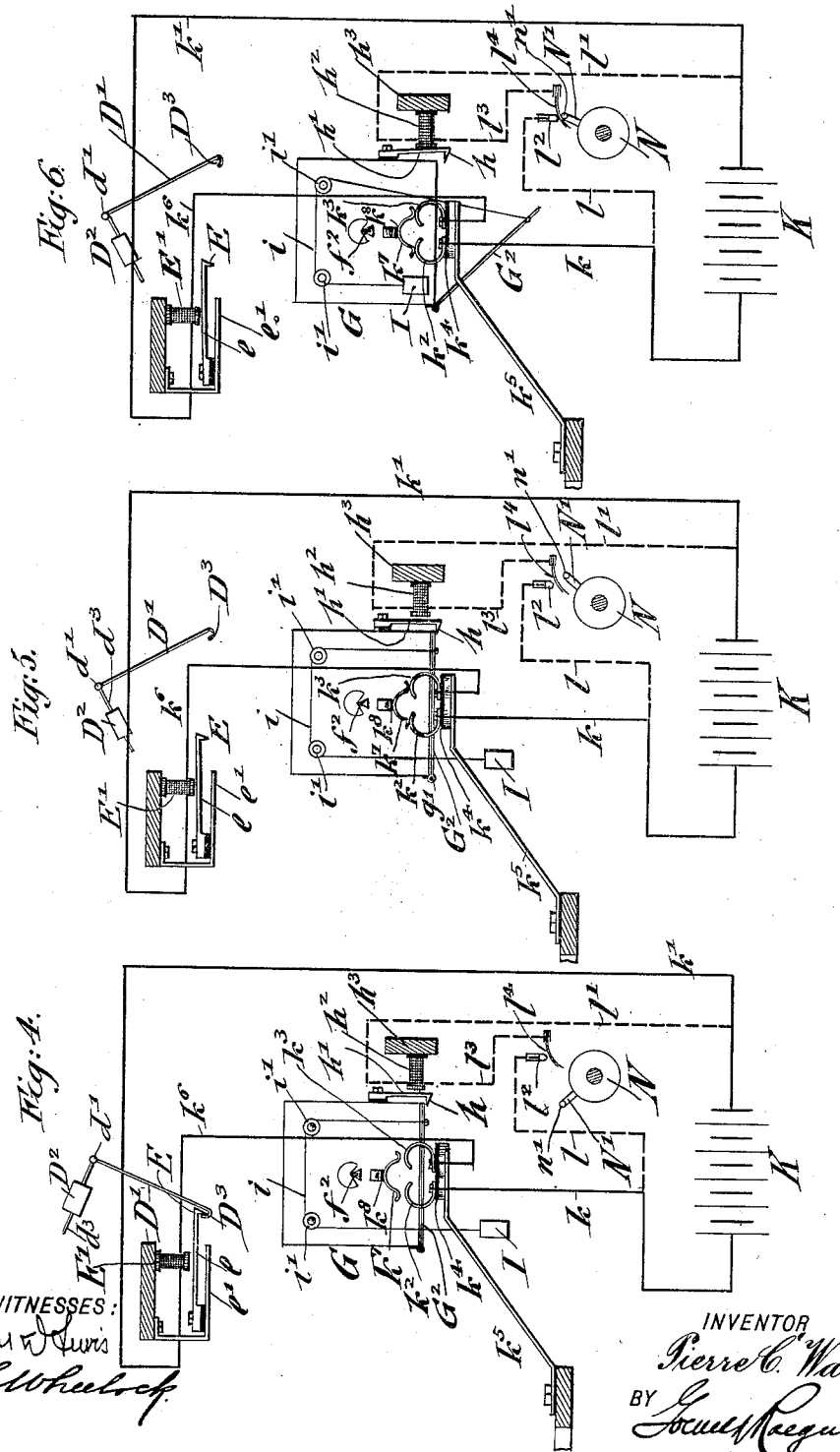

UNITED STATES PATENT OFFICE.

PIERRE C. WARING, OF YONKERS, NEW YORK.

AUTOMATIC FEEDING AND WEIGHING MECHANISM.

SPECIFICATION forming part of Letters Patent No. 698,234, dated April 22, 1902.

Application filed July 17, 1900. Serial No. 23,905. (No model.)

*To all whom it may concern:*

Be it known that I, PIERRE C. WARING, a citizen of the United States, residing at Yonkers, in the county of Westchester and State of New York, have invented certain new and useful Improvements in Automatic Feeding and Weighing Mechanism for Hat-Body-Forming Machines, of which the following is a specification.

The present invention relates to improvements in automatic feeding and weighing mechanism, particularly of that class which is used in connection with hat-body-forming machines, such as is shown and described in my Patent No. 628,879, dated July 11, 1899, in which determined quantities of fibrous material are automatically weighed out and delivered intermittently to the hat-body-forming machine at the end of such predetermined periods of time as may be necessary for the proper working of the said hat-body-forming machine.

The present invention differs from that covered by my aforesaid patent in that the operations for performing the results aimed at are accomplished through the medium of the closing of electric circuits, the current being supplied by means of a battery or other suitable generator.

The main object of the present invention is to secure greater accuracy in weight than heretofore, especially when the feeding and weighing mechanism is used in connection with hat-body-forming machines, inasmuch as it is often required by hat-makers that the fur or fibrous material for a hat-body be weighed out with practical accuracy, which is accomplished in the present invention with even better general results than by hand-weighing.

A further object of the present invention is to so construct and combine the parts of the mechanism as that the sensitiveness of the scale-beam is hardly influenced by anything other than the proper weights and poise and the material to be weighed out.

A still further object of the present invention is to so arrange the deflector, such as covered by my said patent, as that it will return the supply-stream back into the hopper by its own gravity and be returned to material-feeding position positively, in which position it is bodily locked.

These and other objects, which will appear more fully hereinafter, are accomplished through the medium of my improved automatic feeding and weighing mechanism, which comprises in general a weighing mechanism, a deflector, means for feeding the material to be weighed out, an electromagnet or equivalent electrically-excitable device included in an electric circuit, a catch arranged on the armature of the electrically-excitable device and adapted to lock the deflector in position for feeding material to the weighing mechanism, means for closing the said electric circuit, means for discharging the material from the weighing mechanism, and means for returning the deflector to material-feeding position and engaging it with the armature-catch.

My invention further consists of a circuit-closer arranged in a circuit provided with means for permitting the discharging of the material from the weighing mechanism, said circuit being closed by means of a timed tripping or escapement mechanism which closes the circuit through said circut-closer at the expiration of a predetermined interval of time and after the weighing mechanism has resumed its normal position strikes a controlling-lever, which actuates the deflector and returns it to material-feeding position.

The invention further consists of certain other combinations of parts and minor features of construction to be hereinafter described and then particularly pointed out in the claims.

In the accompanying drawings, Figure 1 is a side elevation of my improved feeding and weighing mechanism, showing the same applied to so much of a hat-body-forming machine as is necessary to illustrate the same, parts being removed and parts being in section. In this figure the electric connections are not all shown, as they are clearly shown in other figures. Fig. 2 is a transverse section on the line 2 2, Fig. 1. Fig. 3 is an enlarged detail transverse section of the weigh-box or scale-pan; and Figs. 4, 5, and 6 are diagrammatic views showing the circuit connections and showing the parts successively in position for feeding the material to the weighing mechanism, for returning or deflecting the material from the weighing mechanism after the predetermined quantity has been weighed out and for discharging the material from the weighing mechanism at the expiration of a predetermined interval of time.

Similar letters of reference indicate corresponding parts.

Referring to the drawings, A indicates the main hopper or casing, into which the supply of fur, fibrous material, or other matter, depending upon the application of the mechanism, is charged; B, the toothed endless-belt conveyer or apron arranged in the casing, and C is the main driving-shaft for operating the mechanism.

As usual, there are arranged at the upper part of the endless conveyer B a wiper C' at one side and a clearer C² at the other side, and C³ is an inclined plate arranged under the clearer C² for guiding the material away from the described feeding means, while below the same, separated therefrom by a space C⁴, which leads into the interior of the main hopper or casing A, is another inclined guide-plate C⁵. Arranged adjacent to the upper end of the conveyer or apron B are brackets D, provided with suitable notches $d$, in which is journaled an oscillatory shaft or pivot $d'$, on which is arranged the oscillating deflector D', which is pivoted in a vertical plane, to both sides of which it is movable, hangs downwardly, and which is counterbalanced and caused to assume the position shown in dotted lines in Fig. 1 by means of a counterbalancing-weight D², which is arranged adjustably upon an arm $d^3$, projecting from the shaft $d'$. The lower end of the deflector D' is provided with a lip or shoulder D³, which is adapted to be engaged when the deflector is in material-feeding position by means of a spring-catch E, the body of which preferably forms the armature $e$ of an electromagnet or other electrically-excitable device E', or the armature may consist of a separate block fixed thereto, said magnet being suitably insulated from and supported by a bracket-arm or extension E² on the main hopper or casing A and the inner end of the spring-catch E being fixed to and insulated from a hanger $e'$, depending from the extension or bracket-arm E², as shown clearly in Fig. 1. Said catch E is arranged at a suitable distance from the space or opening C⁴ of the main hopper or casing, which corresponds with the distance through which the said deflector D' swings upon its pivot $d'$, so that when the deflector is in the position shown in full lines engaged by the catch E the material in the hopper or casing will be fed downwardly to the weighing mechanism, and when the deflector is in the position shown in dotted lines the material will be returned back into the main hopper or casing.

Arranged below the deflector D' is the weighing mechanism, which is preferably constructed in the nature of the ordinary beam-scales and comprises the standard or standards $f$, which project from a supplementary casing or frame F, and F' is a yoke-shaped beam fulcrumed on the usual knife-edges at $f'$ and provided with the usual graduations for permitting the proper setting of the poise F². F³ indicates the weights, which are suspended in the usual manner from the scale-beam. The yoke end of the beam F' supports on the knife-edges $f^2$ a scale-pan or weigh-box G, which is prevented from rocking more than is necessary by means of stops or abutments $g$, which project from the scale-pan or weigh-box above the scale-beam and are formed on spider or end frames G', suitably secured to the end of the scale-pan or weigh-box. The lower end of the scale-pan or weigh-box is of course open and is closed when the material is being fed into the scale-pan by means of a movable bottom G², which is hinged at $g'$ to one side of the scale-pan or weigh-box and which at its free edge is engaged and locked into closed position by means of a spring-catch $h$, the end of which is fixed to the scale-pan G and is there insulated from the weigh-box by suitable insulation. The body of this spring-catch $h$ preferably forms the armature $h'$ of an electromagnet or equivalent electrically-excitable device $h^2$, which is mounted upon a support $h^3$ on the scale-pan and is suitably insulated therefrom, said magnet being arranged in such position as that when excited the armature $h'$ will be attracted, the catch $h$ drawn away from the edge of the hinged bottom G², and the same permitted to drop into the position indicated in Fig. 6.

For the purpose of returning the hinged bottom G² to closed position and engaging the same with the catch $h$ a cord $i$ is connected at one end with the outer end of the said hinged bottom and is guided over a pulley or pulleys $i'$, mounted on the end of the scale-pan or weigh-box, while the other end of the cord supports a counterweight I. The weight of the material in the weigh-box when the hinged bottom G² is released is sufficient to counteract the weight of the counterweight I; but as soon as the material has been discharged the said weight I will automatically return the hinged bottom to closed position and engage it with the catch $h$. The scale-pan or weigh-box is so constructed and counterbalanced at the opposite sides of the knife-edges $f^2$ as that the weight I will have no material influence in drawing the scale-pan or weigh-box into inclined position, it being evident that the parts of the box must be so counterbalanced that during the weighing process the scale-pan or weigh-box should remain in approximately horizontal position. The scale-pan or weigh-box is constructed with an adjustable or telescoping section G³, (see Figs. 1 and 3,) which is adjustable in any suitable manner, as by means of threaded projections $x$, which pass through slots $x'$ in the scale-pan, and nuts $x^3$, the object of this adjustable section being to provide a scale-pan or weigh-box which may contain a greater or less quantity of material, according to requirements. When a comparatively small amount of material—as, for instance, two ounces of fur—is to be weighed out and fed to the hat-body-forming machine, the telescoping extension $G^3$ is pushed down as far as possible, and an adjustable section $D^4$ on the deflector $D'$ is also adjusted downwardly as far as possible, while when the amount of material is four ounces, for instance, the deflector is shortened and the extension raised. The object of this is to prevent too great a space between the lower edge of the adjustable section $D^4$ and the top of the body material which has been weighed out, so that the quantity of material in the air between said defined limits will be reduced to a minimum and will not add any material weight to the quantity weighed out. The instant the deflector $D'$ returns, the supply-stream is deflected back into the main hopper or casing.

Referring more particularly to Figs. 4 to 6, K indicates a battery or other suitable generator, which, as shown in Fig. 1, is arranged at the base of the apparatus, and $k\ k'$ are line-wires of the main circuit, which wires respectively lead to a spring or other suitable contact $k^2$ of a circuit-closer, which contact $k^2$ is insulated from another contact $k^3$ by means of an insulating-block $k^4$, riveted or otherwise suitably secured to a supporting-arm $k^5$, fixed to the frame or casing F, while the other wire $k'$ is connected with the electromagnet or other electrically-excitable device $E'$, before referred to. The electromagnet $E'$ is connected on the other side, by means of a connecting-wire $k^6$, with the other contact $k^3$. The connections just described constitute the main circuit. A branch or shunt circuit is also shown in said diagrams, the same comprising line-wires $l\ l'$, electrically connected, respectively, with the wires $k\ k'$ of the main circuit and with a fixed contact-point $l^2$, arranged at the side of the main hopper or casing and suitably insulated therefrom, and with the before-referred-to second electromagnet $h^2$ or other equivalent electrically-excitable device. The other side of the electromagnet $h^2$ is connected by a wire $l^3$ with a spring-contact $l^4$, which preferably consists of several laminæ of copper and is normally held out of contact by its own resiliency, with the fixed contact $l^2$ forming the other part of this circuit-closer. The contacts $k^2\ k^3$ may evidently consist of the well-known mercury-cups, which offer only the slightest resistance and afford a perfect contact for the movable double contact $k^7$, insulated from and suitably supported by the scale-pan or weigh-box at $k^8$.

In connection with the described parts there is employed a timed controlling or escapement mechanism, such as shown and described in my aforesaid patent, the same, instead of acting on a member which positively controls the deflector to move it to material-returning position, acting on a member which positively returns the deflector to material-feeding position, which deflector in the patent gravitates to this position. This is for the purpose of securing a quick return of the deflector to a material-feeding position and for maintaining this position by a positive lock. The timed controlling or escapement mechanism is timed, when the apparatus is used in connection with a hat-body-forming machine, to the interval which is necessary to enable the attendant at the cone to remove a previously-formed hat-body from the cone, to perform the necessary manipulations, and to close the doors again after replacing another cone. Referring to Figs. 1 and 2, the timed controlling or escapement mechanism consists in the present invention of a gear-wheel M, which is driven from a pinion $C^x$, arranged on the drive-shaft C, driven from a suitable source of power, said gear-wheel M and a cone-pulley $M'$ being mounted on a shaft $M^2$, journaled in the casing or main hopper A. Over this cone-pulley $M^2$ passes a crossed belt $m$, which passes over a second or timed cone-pulley N, which is journaled on a suitable journal pin or shaft $n$. This pulley N carries a tappet $N'$, projecting radially from the same and provided at its outer end with a toe $n'$, which rotates in the plane of the movable contact $l^4$.

The mechanism as far as described operates as follows, assuming that the parts are in the position shown in Figs. 1 and 4 in full lines: In this position the deflector $D'$ is locked in material-feeding position by means of the catch E. The movable bottom $G^2$ of the scale-pan or weigh-box is locked in closed position by means of the catch $h$, and both circuit-closers $k^2\ k^3\ k^7$ and $l^2\ l^4$ are open. A suitable quantity of material being now charged into the hopper or main casing A and the conveyer-belt B set in motion, the material in the hopper A is fed over the plate $C^3$ into the scale-pan or weigh-box G, preferably dropping it in transit upon the guide-plate $C^5$, although it is evident that if the latter be dispensed with and the parts properly arranged the material will fall directly into the scale-pan or weigh-box. The poise $F^2$ having been set to the proper position for the weight to be determined and a quantity of material fed into the scale-pan or weigh-box corresponding with such weight—say four ounces—the scale-beam will move, as will also the scale-pan or weigh-box $G'$, and the instant the predetermined amount has been weighed the main circuit of the battery will be closed through contact $k^7$ touching the contact $k^2\ k^3$, whereupon the electromagnet $E'$ is instantly excited, so as to attract its armature $e$, thereby raising the catch E and disengaging it from the lip or shoulder $D^3$ on the deflector $D'$, which deflector is instantly moved by the action of its counterweight $D^2$ into the position shown in dotted lines in Fig. 1 and in full lines in Figs.

5 and 6 and is caused thereby to return the material back into the main hopper or casing and to prevent a further supply to the weighing mechanism until the proper moment. The predetermined weight charged into the scale-pan or weigh-box is not dropped until the expiration of a predetermined interval of time, depending upon when the material is to be fed to the hat-body-forming machine, at the expiration of which time the pin $n'$ on the tappet $N'$ of the time-controlling or escapement mechanism strikes the movable contact $l^4$ of the circuit-closer of the shunt-circuit, as shown in Fig. 6, and causes it to touch the other contact $l^2$, thereby closing the shunt-circuit and exciting its electromagnet $h^2$, attracting the armature $h'$, and releasing the catch $h$ from engagement with the movable bottom $G^2$ of the scale-pan or weigh-box, whereupon the movable bottom swings downwardly on its pivot, due to the weight of the material, and the material is dropped. The timed pulley N, continuing to rotate, carries the tappet $N'$ around with it, giving time to the weighing mechanism to return to its normal position, whereupon the tappet engages the end of a controlling-lever O, pivoted at $o$ to the main hopper or casing, causing the latter to exert a pull upon the cord or wire $O'$, which at its upper end is connected with a crank-arm $d^5$ on the pivot-shaft $d'$ of the deflector, thereby positively actuating the deflector and moving it from the position shown in dotted lines in Fig. 1 to the position shown in full lines in said figure and in Fig. 4, so that the same is caused to engage again with the catch E, the circuit in the meantime having been broken, as is evident.

The mechanism used in connection with a hat-body-forming machine comprises, as shown in Fig. 1, a horizontal conveyer-belt P, which is trained over the drive-shaft C and over a roll $p$, constituting one of a pair of feed-rolls $p$ $p'$, and onto this conveyer-belt P the fibrous material is dropped from the scale-pan or weigh-box. There is also arranged in connection with the feed-rolls $p$ $p'$ an equalizing or distributing chamber Q, such as shown in the patent of F. F. Poole, No. 556,861, dated March 24, 1896, in which is arranged a picking-cylinder $Q'$ for the purpose of disintegrating and equalizing the fibrous material, which drops upon a second horizontal conveyer-apron $Q^2$, driven by suitable power connections and which transmits the bat of fur or fibrous material formed thereby, with the assistance of a condensing-roll $Q^3$, to a pair of upwardly-extending coöperating parallel feed-aprons R R', which at their lower ends are trained over guide-rollers $r'$ and at their upper ends over guide-rollers $r^2$ $r^3$, from whence the bat of fibrous material carried up is fed onto the conveyer-apron S, which carries the bat to the hat-forming machine proper. It has been found in practice, especially in damp cold weather, that some of the fibrous material of the bat will adhere to the upwardly-extending apron R', thus lessening the amount of the predetermined quantity of fur and resulting in an underweight hat-body. To obviate this difficulty, there is arranged above the guide-roller $r^3$ a clearer T, which is provided with clearer-blades $t'$ and which clearer is rotated from any suitable source of power in the direction indicated by the arrow. By means of the described clearer T the material which might otherwise adhere to the apron R' is forced back and caused to travel along with the bat.

As compared with the construction shown in my aforesaid patent it is evident that the weighing mechanism has been simplified, as no consideration of a separate counterbalancing scale-beam enters, which scale-beam exerted a friction upon the tilting platform or movable bottom. In the present invention all friction is reduced to a minimum during the weighing operation. It should be said in connection with the counterweight for returning the movable bottom of the scale-pan or weigh-box to normal position after dumping of the material weighed that it is advantageous, as the counterweight always exerts an upward force on the hinged bottom, which is approximately always of the same stress without regard to the position of the hinge plate or bottom.

Having thus described my invention, what I claim as new, and desire to secure by Letters Patent, is—

1. The combination, with the feeding means, a stream-deflector, constructed and arranged to prevent accumulation of material behind the same when in non-feeding position, weighing mechanism, and means for operating the deflector to deflect the stream back to the feeding means, of a catch or detent for engaging the discharge portion of the weighing mechanism, a timed controlling device, means operated by the same for automatically releasing said catch, and a deflector-returning device actuated by the timed controlling device immediately after the release of the said catch and the return of the weighing mechanism to normal position, substantially as set forth.

2. The combination, with the feeding means, a stream-deflector constructed and arranged to prevent accumulation of material behind the same when in non-feeding position, and weighing mechanism, of means for locking the deflector in feeding position, means for automatically unlocking the same upon obtaining the predetermined weight, a catch for engaging the discharge portion of the weighing mechanism, a timed controlling device, means operated by the same for automatically releasing said catch, and a deflector-returning device actuated by the timed controlling device immediately after the release of the said catch and the return of the weighing mechanism to normal position, substantially as set forth.

3. The combination, with the feeding means, a stream-deflector constructed and arranged to prevent accumulation of material behind the same when in non-feeding position, weighing mechanism, and means for operating the deflector in one direction, of a catch for supporting the discharge portion of the weighing mechanism, a timed controlling device, means for changing the rate of speed of said controlling device, means operated by the timed controlling device for automatically releasing said catch, and a deflector-returning device independent of said catch and catch-releasing means, the same being actuated by the timed controlling device immediately after the release of said catch and the return of the weighing mechanism to normal position, substantially as set forth.

4. The combination, with weighing mechanism, of feeding means, a pivoted hanging deflector constructed and arranged to prevent accumulation of material behind the same when in non-feeding position, a counterweight for moving the deflector to material-returning position, and automatic means absolutely independent of the weighing mechanism for returning the deflector to material-feeding position immediately after the return of the weighing mechanism to normal position, substantially as set forth.

5. The combination with weighing mechanism, comprising a weighing-bucket, adjustable in size, of a deflector adjustable in length relatively to the normal position of the weighing-bucket, and means for feeding material, said deflector being arranged between the discharge portion of the feeding means and the weighing-bucket, substantially as set forth.

6. The combination with suitable weighing mechanism, of means for feeding material, and a deflector adjustable in length and arranged in the space through which the material normally passes to the scale pan or bucket of the weighing mechanism, substantially as set forth.

7. The combination, with weighing mechanism comprising a scale-beam and a suspended bucket or weigh-box, of material-feeding means, a movable deflector constructed and arranged to prevent accumulation of material behind the same when in non-feeding position, means, entirely dependent of any positive influence of but controlled by the weighing mechanism, for shifting said deflector to deflect, by one movement, the entire supply-stream from said bucket said weighing mechanism being free from any retarding action of said shifting means, means for restraining the tendency of said shifting means and maintaining the deflector in full discharge position during the weighing, means suitably connected with the weighing mechanism for releasing the deflector from said deflector-restraining means, and means, independent of said shifting means and entirely independent of any influence of the weighing mechanism, for automatically and positively moving the deflector back to material-feeding position at regular predetermined intervals of time, substantially as set forth.

8. The combination, with weighing mechanism, of feeding means, a movable deflector constructed and arranged to prevent accumulation of material behind the same when in non-feeding position, means for positively locking the deflector in full material-feeding position, means for automatically releasing the deflector therefrom on obtaining the weight set, means for instantaneously shifting said deflector to full material-returning position, and means for positively and automatically moving the deflector back to locked position at regular and predetermined intervals of time immediately after the return of the weighing mechanism to normal position, substantially as set forth.

9. The combination, with power-driven mechanism, material-feeding means, and means for intercepting the feed of material, of weighing mechanism provided with a movable discharge portion, a catch engaging said discharge portion, a conveyer driven from said power-driven mechanism and onto which the material is dropped from the bucket, an electromagnetic circuit, a circuit-closer, and a rotary tappet for striking the movable member of the circuit-closer, said tappet being timed relatively to the conveyer for causing it to close the circuit and thereby disengage said catch at the expiration of a predetermined period of time, substantially as set forth.

10. The combination with the feeding means, a gravitating deflector and weighing mechanism, of means for locking said deflector in feeding position, means for automatically unlocking the same, a source of electricity, an electromagnet, the armature of which is provided with a catch for engaging the discharge portion of the weighing mechanism, a circuit-closer, line connections between the source of electricity, magnet and circuit-closer, a timed controlling device for closing the circuit through said circuit-closer, and a deflector-returning device actuated by the timed device after the breaking of the circuit, substantially as set forth.

In testimony that I claim the foregoing as my invention I have signed my name in presence of two subscribing witnesses.

PIERRE C. WARING.

Witnesses:
JULIUS TACHMAN,
CHAS. H. DESGREY.